(12) United States Patent
Ai (10) Patent No.: US 10,428,870 B2
(45) Date of Patent: Oct. 1, 2019

(54) ROLLER BEARING WITH ENHANCED ROLLER-END AND FLANGE CONTACT

(71) Applicant: The Timken Company, North Canton, OH (US)

(72) Inventor: Xiaolan Ai, Massillon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 16/075,505

(22) PCT Filed: Jul. 10, 2017

(86) PCT No.: PCT/US2017/041309
§ 371 (c)(1),
(2) Date: Aug. 3, 2018

(87) PCT Pub. No.: WO2018/017352
PCT Pub. Date: Jan. 25, 2018

(65) Prior Publication Data
US 2019/0040905 A1    Feb. 7, 2019

Related U.S. Application Data

(60) Provisional application No. 62/363,898, filed on Jul. 19, 2016.

(51) Int. Cl.
*F16C 19/22*    (2006.01)
*F16C 33/58*    (2006.01)

(52) U.S. Cl.
CPC .......... *F16C 19/225* (2013.01); *F16C 33/583* (2013.01)

(58) Field of Classification Search
CPC ...... F16C 19/225; F16C 19/26; F16C 33/583; F16C 33/585
(Continued)

(56) References Cited

U.S. PATENT DOCUMENTS 1,727,576 A * 9/1929 Umstattd ............... F16C 19/364
384/571
4,318,574 A * 3/1982 Nakamura ............... F16C 19/26
384/564

(Continued)

OTHER PUBLICATIONS

International Search Report and Written Opinion of PCT/US2017/041309, dated Oct. 19, 2017 (14 pages).

*Primary Examiner* — James Pilkington
(74) *Attorney, Agent, or Firm* — Michael Best & Friedrich LLP (57) ABSTRACT

A roller bearing (10) defines a bearing axis (34) and a radial plane (52) oriented parallel with the bearing axis. The roller bearing (10) includes an inner ring (42) having an inner raceway (44) and an inner flange (46) extending from the inner raceway. The inner flange (46) includes an inner guide surface (48). The roller bearing (10) also includes a plurality of rollers (22) in rolling engagement with the inner raceway (44) about the bearing axis (34). Each roller (22) includes a first end surface (24a) in engagement with the inner guide surface (48) of the inner flange (46) as the plurality of rollers (22) move relative to the inner ring (42). The first end surfaces (24a) of each roller (22) define a curvature such that a ratio of a first principal effective curvature (Rx) radius in a plane perpendicular to the radial plane (52) and a second principal curvature radius (Ry) in the radial plane (52) is no less than 3.0.

3 Claims, 6 Drawing Sheets

(58) Field of Classification Search
USPC .................................................. 384/564, 565
See application file for complete search history.

(56) References Cited

U.S. PATENT DOCUMENTS

| | | |
|---|---|---|
| 5,007,747 A | 4/1991 | Takeuchi et al. |
| 6,530,693 B1 | 3/2003 | Ijuin et al. |
| 2003/0091255 A1 | 5/2003 | Sakoda et al. |

* cited by examiner

ROLLER BEARING WITH ENHANCED ROLLER-END AND FLANGE CONTACT

RELATED APPLICATIONS

This application is a national phase application under 35 U.S.C. § 371 of International Patent Application No. PCT/US2017/041309 filed Jul. 10, 2017, which claims the benefit of U.S. Provisional Patent Application No. 62/363,898 filed Jul. 19, 2016, the entire contents of both of which are hereby incorporated by reference herein.

BACKGROUND

Engagement between a roller end and a bearing race flange is commonly seen in tapered roller bearings and in cylindrical roller bearings. The contact serves to guide the rollers and bear axial load. The conditions of the contact are determined by a flange and roller end geometry, which in turn, dictates the axial load carrying capacity of the bearing as well as a flange torque and a wear rate at the surfaces of the roller end and the flange.

For tapered roller bearings, the contact portion of the roller ends is often machined spherical in shape. Spherical roller ends are also used in cylindrical roller bearings (as disclosed within U.S. Pat. No. 6,530,693). This results in a contact ellipse between the inner raceway flange and roller end whose major axis is arranged in the radial direction of the bearing. As the contact load increases, the contact ellipse may be truncated by an undercut or an outer diameter of the bearing flanges. To reduce the risk of truncation of the contact footprint between the roller end and the flanges, and thus reduction of edge loading, cylindrical roller ends are often machined to a torus (as disclosed within U.S. Patent Application Publication No. 2003/0091255) to produce an ellipse whose major axis lies along a circumferential direction.

SUMMARY

The present invention relates to roller bearings, in general, and to a roller bearing with an enhanced roller end and flange contact. The enhancement provides an optimal contact footprint between the roller end and bearing flange that results in reduced bearing rib torque for given surface finishes and anticipated operation conditions.

In one aspect, a roller bearing defines a bearing axis and a radial plane oriented parallel with the bearing axis. The roller bearing includes an inner ring having an inner raceway and an inner flange extending from the inner raceway. The inner flange includes an inner guide surface. The roller bearing also includes a plurality of rollers in rolling engagement with the inner raceway about the bearing axis. Each roller includes a first end surface in engagement with the inner guide surface of the inner flange as the plurality of rollers move relative to the inner ring. The first end surfaces of each roller define a curvature such that a ratio of a first principal effective curvature radius in a plane perpendicular to the radial plane and a second principal curvature radius in the radial plane is no less than 3.0.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate an embodiment of a cylindrical roller bearing 10. The illustrated roller bearing 10 includes an outer ring 12, an inner ring 42, rolling elements 22, and a roller retainer 32 concentric with a rotational bearing axis 34. The outer ring 12 includes an outer raceway 14 and at least one outer raceway flange 16 positioned at an axial end of the outer raceway 14 with the outer raceway flange 16 extending radially inwardly toward the inner ring 42. In other embodiments, the outer ring 12 may include two opposing outer raceway flanges 16. The illustrated inner ring 42 includes an inner raceway 44 and at least one inner raceway flange 46 positioned at an axial end of the inner raceway 44 with the inner raceway flange 46 extending radially outwardly toward the outer ring 12. In other embodiments, the inner ring 42 may include two opposing inner raceway flanges 46. The illustrated rolling elements 22 are annularly separated evenly by the roller retainer 32 and are arranged between the inner and outer raceways 44, 14. Each roller element 22 is in rolling contact with the inner and outer raceways 44, 14 about a rolling element axis 23. In other embodiments, the cylindrical roller bearing 10 may be another type of bearing (e.g., a tapered roller bearing or a spherical roller bearing).

Figure 1:
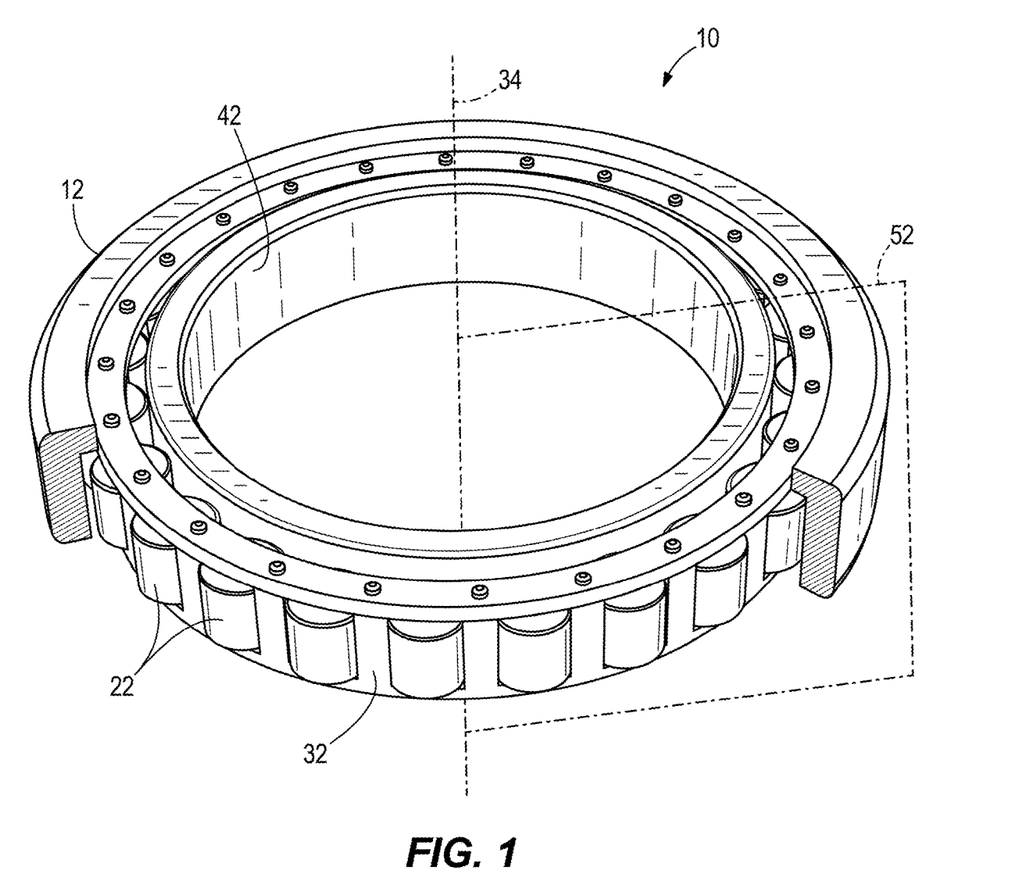
FIG. 1 is a perspective view of a roller bearing according to an embodiment of the invention including an outer ring, an inner ring, and rolling elements.
Figure 2:
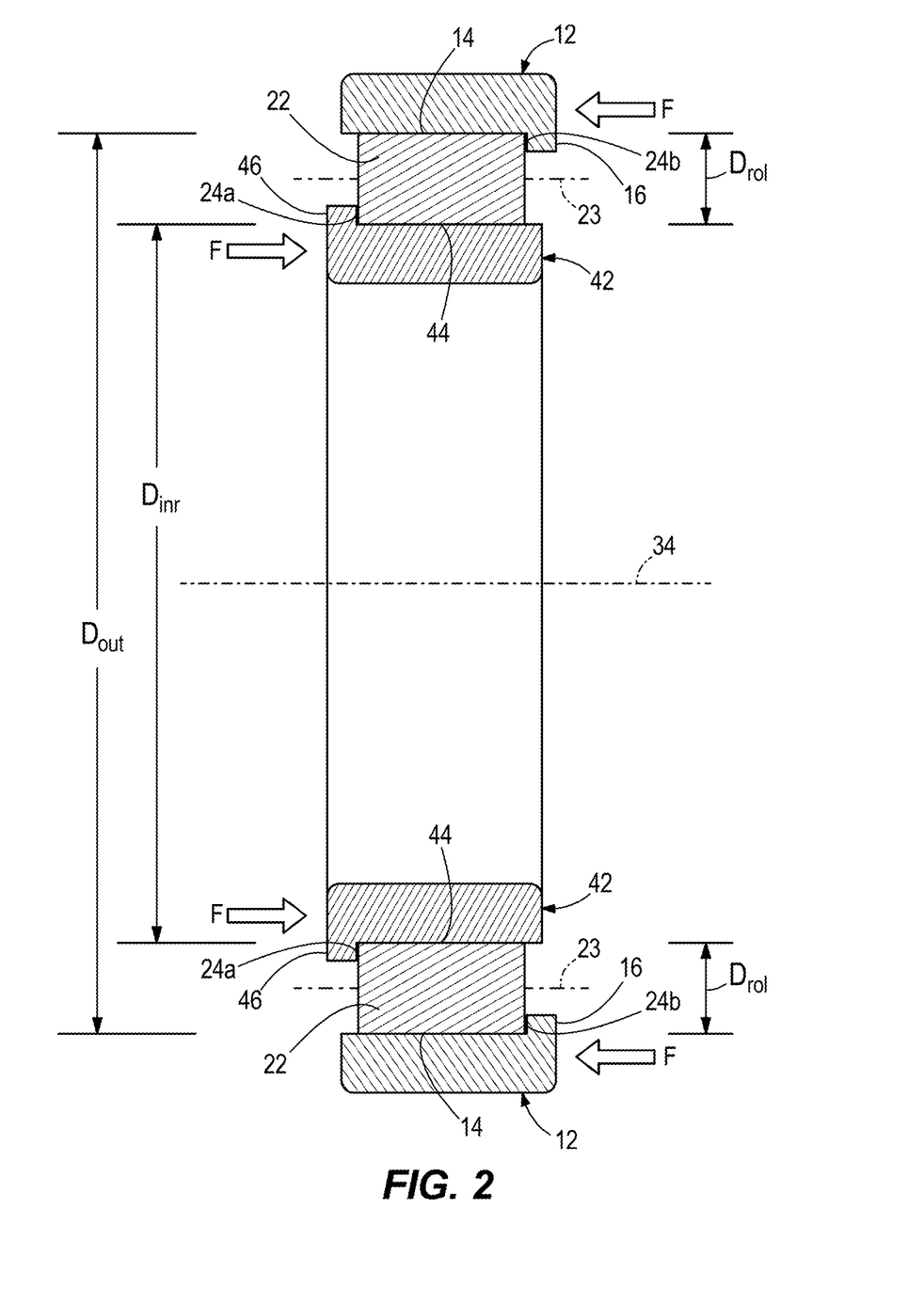
FIG. 2 is a cross sectional view taken along a radial plane of the roller bearing of FIG. 1.
Figure 3A:
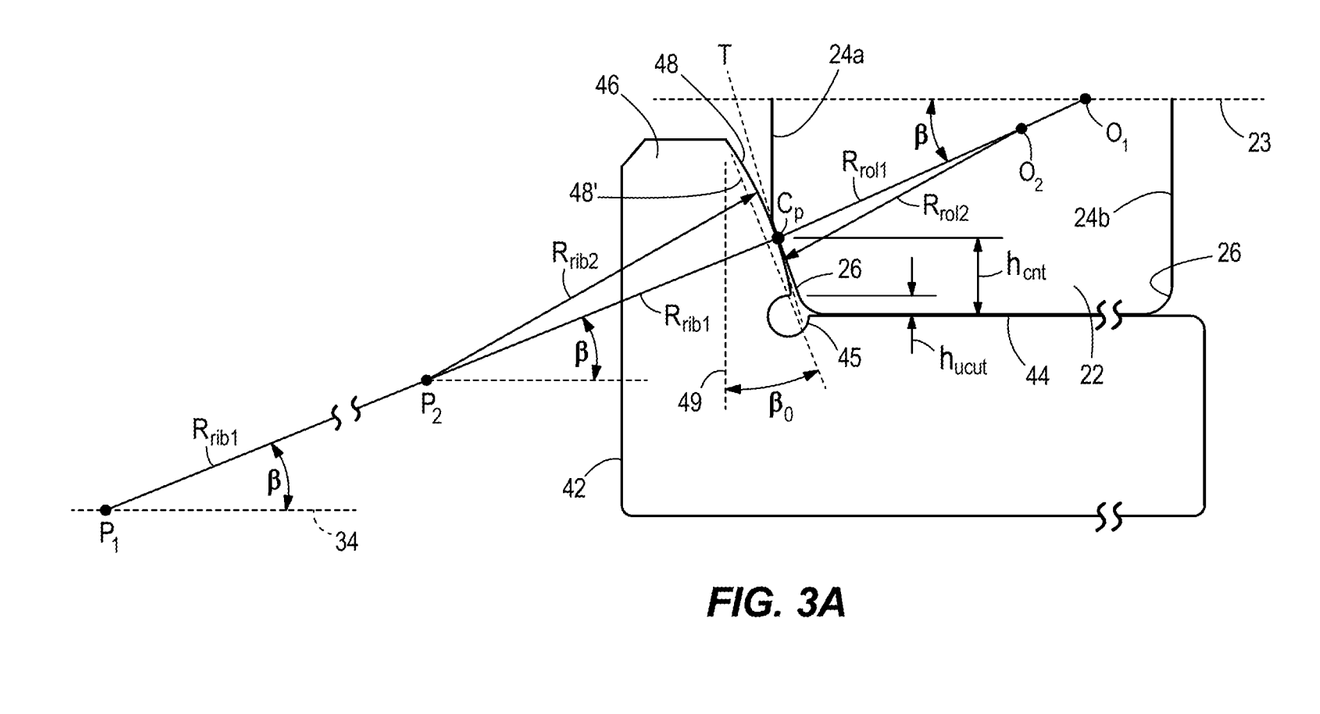
FIG. 3A is an enlarged, partial detailed view of FIG. 2 illustrating an engagement between one of the rolling elements and the inner ring.

With reference to FIGS. 2 and 3A, when axial loads F are applied to the roller bearing 10 (e.g., the axial loads F act on the inner and/or outer rings 42, 12 to compress the rolling elements 22), a contact surface 48 of the inner raceway flange 46 and a first end face 24a of the roller elements 22 abut at a contact area or point $C_P$ (see FIG. 3A). A similar abutment occurs with a second end face 24b of the roller elements 22 and the outer raceway flange 16 (see FIG. 3B). In one embodiment, a contact surface 48' of the inner raceway flange 46 includes a linear cross sectional profile within a radial plane 52 (see FIG. 1) of the roller bearing 10 so that the contact surface 48' is oriented at a contact angle $\beta_0$ (also referred to as the nominal contact angle) relative to a line 49 perpendicular to the rotational bearing axis 34. The radial plane 52 is parallel with the rotational bearing axis 34. In another embodiment, the contact surface 48 may be crowned to produce a convex or a concave curvature radius $R_{rib2}$ with a center of the curvature located at $P_2$ that is within the radial plane 52 of the roller bearing 10. For a crowned flange surface 48, an actual contact angle $\beta$, defined as the angle between a tangent line T through the contact point $C_p$ and the perpendicular line 49 to the bearing axis 34 may not be equal to the nominal contact angle $\beta_0$. The illustrated roller end faces 24a, 24b are profiled in the radial plane 52 at least in the areas where contact between the raceway flanges 16, 46 and the roller elements 22 occur. A curvature radius $R_{rol2}$ of the first end face 24a is defined near the contact point $C_P$ and includes a center of the curvature at $O_2$. Thus, an effective curvature radius $R_y$ of the contact between the rolling elements 22 and the inner raceway flange 46 within the radial plane 52 is:

$$R_y = \frac{R_{rib2} \cdot R_{rol2}}{R_{rib2} + R_{rol2}} \tag{1}$$

$R_y$ is often referred to as the second effective principal curvature radius at the contact between the rolling elements 22 and the inner raceway flange 46.

With drawing a line $P_1O_1$ perpendicular to the tangential line T through the contact point $C_P$, the line intersects the rolling element axis 23 of the rolling elements 22 at $O_1$ and intersects the rotational bearing axis 34 of the roller bearing 10 at $P_1$. $P_1C_P$ represents a principle radius $R_{rib1}$ of the flange surface 48 in a plane perpendicular to the radial plane 52, likewise, $O_1C_p$ represents a principle radius $R_{rol1}$ of a roller end face 26 in a plane perpendicular to the radial plane 52. The principle radii $R_{rib1}$, $R_{rol1}$ are defined by an inner raceway diameter $D_{inr}$ of the inner raceway 44, a rolling element diameter $D_{rol}$ of the rolling elements 22, a contact height $h_{cnt}$ from the inner raceway 44 to the contact point $C_p$, and the contact angle $\beta$.

$$R_{rol1} = \frac{D_{rol}/2 - h_{cnt}}{\sin\beta}$$

$$R_{rib1} = \frac{D_{inr}/2 + h_{cnt}}{\sin\beta}$$

Thus, for the inner raceway flange 46, an effective curvature radius $R_x$ of the contact between the rolling elements 22 and the inner raceway flange 46 in a plane perpendicular to the radial plane 52 is:

$$R_x = \frac{(D_{rol} - 2h_{cnt})(D_{inr} + 2h_{cnt})}{2(D_{rol} + D_{inr})\sin\beta} \tag{2a}$$

$R_x$ is also referred to as the first effective principal curvature radius at the contact between the rolling elements 22 and the inner raceway flange 46.

Figure 3B:
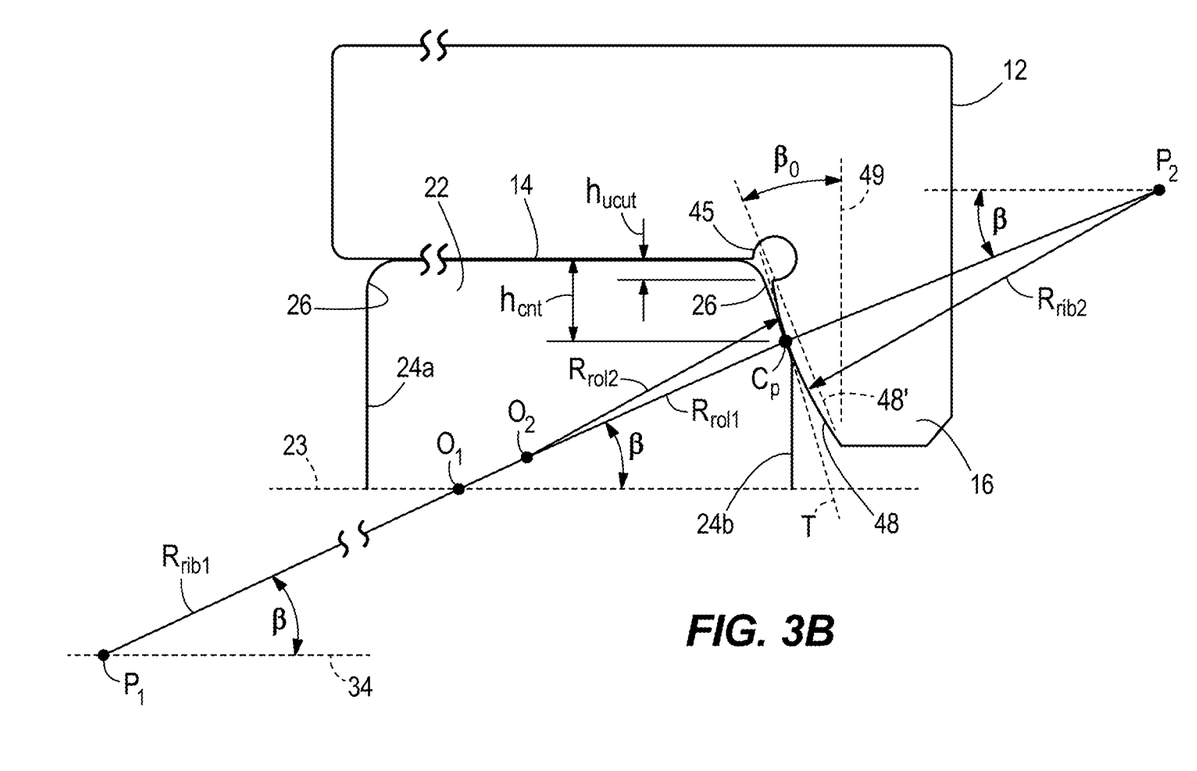
FIG. 3B is an enlarged, partial detailed view of FIG. 2 illustrating an engagement between one of the rolling elements and the outer ring.

For the outer raceway flange 16, a first effective principal curvature radius $R_x$ at the contact between the roller end 24b and the flange surface of the outer raceway flange 16 in a plane perpendicular to the radial plane 52 is:

$$R_x = \frac{(D_{out} - 2h_{cnt})(D_{rol} - 2h_{cnt})}{2(D_{out} - D_{rol})\sin\beta} \tag{2b}$$

With the amendments to equation (2b), equation (2b) now states:

$$R_x = \frac{(D_{out} - 2h_{cnt})(D_{rol} - 2h_{cnt})}{2(D_{out} - D_{rol})\sin\beta} \tag{2b}$$

As such, the first effective principal curvature radius R), of the outer raceway flange 16 is defined by a diameter $D_{out}$ of the outer raceway 14, the rolling element diameter $D_{rol}$, the contact height $h_{cnt}$ from the outer raceway 14 to the corresponding contact point $C_p$, and the contact angle $\beta$ between the roller end 24b and the outer raceway flange 16.

Figure 4:
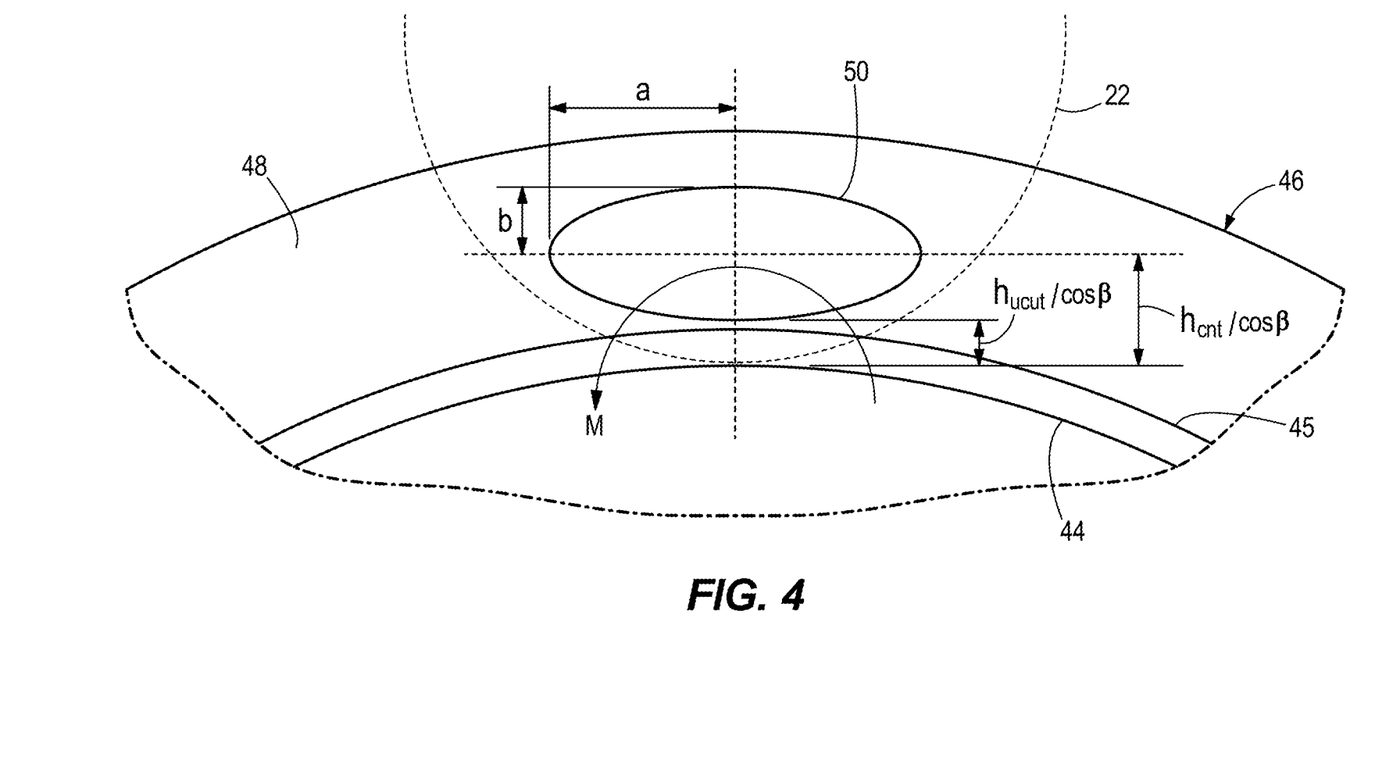
FIG. 4 illustrates the engagement between one of the rolling elements and the inner ring in a plane that is perpendicular to the radial plane.

With reference to FIG. 4, under a bearing axial load F, the footprint at the contact area $C_P$ assumes an ellipse 50 with a semi major dimension a and a semi-minor dimension b. As the load F increases, the footprint 50 increases in size, with the periphery of the ellipse 50 moving closer to a boundary of an undercut 45 between the flange surface 48 and the inner raceway 44. A similar undercut is located between the outer flange 16 and the outer raceway 14. The shape of the contact footprint 50, defined as the ellipticity k=a/b of the contact ellipse 50, is determined uniquely by the ratio of the first and second effective principal curvature radii $k_r=R_x/R_y$ and vice versa. The relationship between k and $k_r$ can be expressed by elliptical integrals of first and second kinds, K(e) and E(e).

$$k_r = \frac{k^2 E(e) - K(e)}{K(e) - E(e)} \tag{3}$$

$$e = \sqrt{1 - \frac{1}{k}}$$

Sliding contact between the roller ends 24a, 24b and the corresponding raceway flange 16, 46 causes power loss and material wear. It is known to those skilled in the art, bearing torque mainly comes from raceway torque which is governed by rolling resistance between the rollers 22 and the inner and outer raceways 14, 44, and flange torque which is caused by the sliding frictions between the roller ends 24a, 24b and the inner and/or outer flanges 16, 46. Under low speed and thrust load operation conditions, the flange torque usually dominates. Therefore, to reduce bearing torque, and thus wear and power loss, it is desirable to minimize a friction moment M (see FIG. 4) between the roller ends 24a, 24b and the raceway flanges 16, 46.

With continued reference to FIG. 4, the friction moment M is defined at the contact ellipse 50 between the roller ends 24a, 24b and the corresponding raceway flanges 16, 46, which is an important component of bearing flange torque and can be expressed as a product of a geometry function $f_{GM}$, a load function $f_{LD}$, and a curvature ratio function $f_{CR}$.

$$M = f_{GM} \cdot f_{LD} \cdot f_{CR} \tag{4}$$

where $f_{GM}$ is a function of the contact angle $\beta$ and bearing geometry parameters, which define the first principal effective curvature radius $R_x$; $f_{LD}$ is a function of contact load and material properties; and $f_{CR}$ is a function of a non-dimensional contact height $H_{cnt}$ and the ratio of the effective principal curvature radii $k_r$, which in turn, is a function of the contact ellipticity k.

$$f_{CR}(k, H_{cnt}) = k_r^{-\left(\frac{1}{6}\right)} \cdot F(k) \cdot I_\mu(k, H_{cnt}) \quad (5)$$

In the above equation (5), F(k) is the shape factor of the contact ellipse 50 and is defined by the first and second elliptical integrals K(e) and E(e)

$$F(k) = \left(\frac{4}{\pi}\right)^{\frac{1}{3}} \frac{\{[k^2 E(e) - K(e)] \cdot [K(e) - E(e)]\}^{\frac{1}{6}}}{k^{\frac{1}{2}} \cdot e^{\frac{2}{3}}} \quad (6)$$

$I_\mu(k, H_{cnt})$ is an integral of friction moment and is defined as:

$$I_\mu(k, H_{cnt}) = \quad (7)$$
$$\int_{-1}^{1} \int_{1-\sqrt{1-X^2}}^{1+\sqrt{1-X^2}} \mu(k) \sqrt{\left(kX^2 + \frac{Y^2}{k}\right) \cdot [1 - X^2 - (Y - H_{cnt})^2]} \, dY dX$$

where X and Y are non-dimensional coordinates, X=x/a, Y=y/b, and $H_{cnt}$ is the non-dimensional contact height measured in the tangential plane of the contacting surfaces, $H_{cnt}=h_{cnt}/(b*\cos(\beta))$. $\mu(k)$ is the friction coefficient which is a function of the lambda ratio $\lambda$ defined as the ratio of lubrication (e.g., oil) film thickness to the composite surface roughness of the contacting surfaces 24a, 48. Since the lubrication film thickness between the contact surfaces 24a, 48 varies with the ellipticity k, μ in turn can be expressed as a function of k for a given lubrication condition characterized by a nominal lambda ratio $\lambda_0$.

Figure 5:
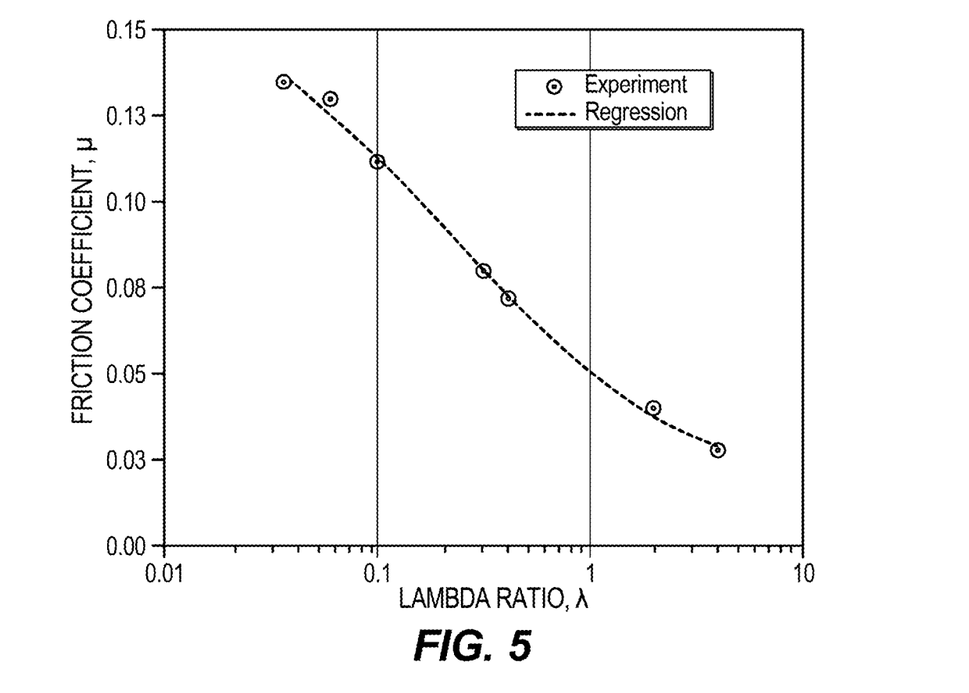
FIG. 5 illustrates a relationship between friction coefficient and the lambda ratio of the roller bearing at the roller-end and flange contact.

FIG. 5 illustrates an example friction coefficient μ as a function of lambda ratio λ for typical engineering surfaces. The following regression relationship between friction coefficient μ and lambda ratio λ can be obtained:

$$\mu = 0.0207 \exp[2.197 \exp(-0.894\lambda^{0.539})] \quad (8)$$

where the lambda ratio λ is related to the ellipticity k:

$$\lambda = \lambda_0 [1 - \exp(-0.68/k)] \quad (9)$$

As can be appreciated by those skilled in the art, the contact profile in the radial plane 52, which in turn is determined by the crown of the flanges 16, 46 and the curvature of the roller ends 24a, 24b in the radial plane 52, hardly affect the geometry function $f_{GM}$ and the load function $f_{LD}$. Thus, contact profile optimization to minimize bearing's friction moment M, and thus flange torque is equivalent to minimization of the curvature ratio function $f_{CR}$ as suggested by equation (4). That is to say, $$f_{CR\_min}(k_m, H_{cnt}) = \min_{k=k_m} f_{CR}(k, H_{cnt}) \quad (10a)$$

where $k_m$ refers to the contact footprint ellipticity k that minimizes $f_{CR}$ for a given $H_{cnt}$.

Since the curvature ratio of the contact $k_r$ is uniquely determined by the ellipticity k of the contact footprint 50, and $H_{ucut}=H_{cnt}-1.0$, thus $f_{CR}$ can also be expressed as a function of the curvature ratio $k_r$ and $H_{ucut}$. Correspondingly, the minimization of $f_{CR}$ can be obtained in terms of $k_{rm}$ and $H_{ucut}$:

$$f_{CR\_min}(k_{rm}, H_{ucut}) = \min_{k_r=k_{rm}} f_{CR}(k_r, H_{ucut})$$
$$= \min_{k=k_m} f_{CR}(k, H_{ucut}) \quad (10b)$$

Figure 6:
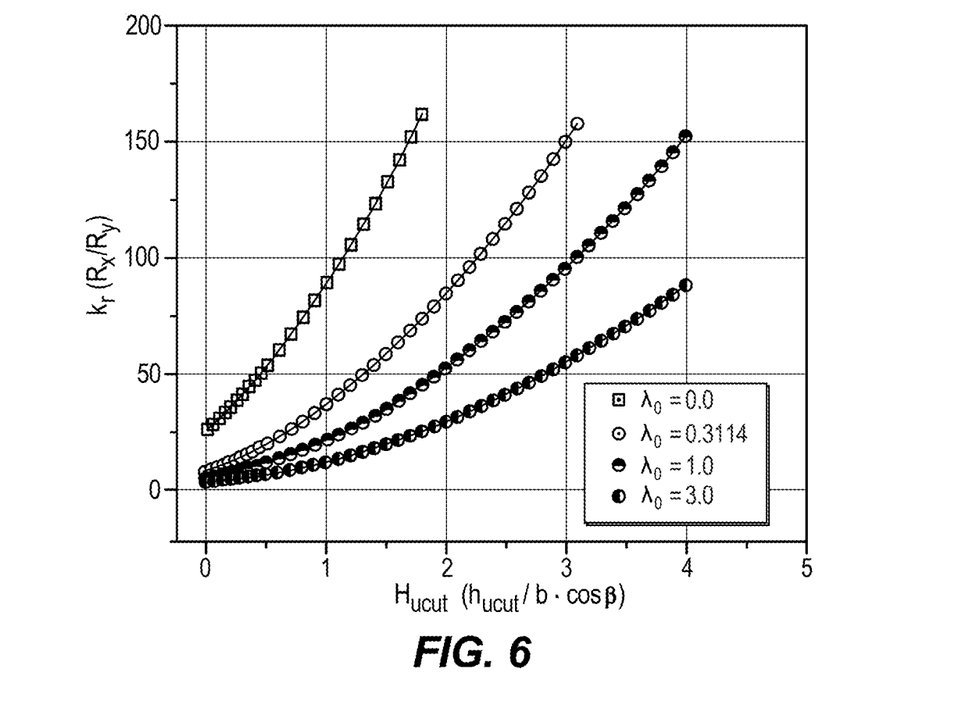
FIG. 6 illustrates an example of an optimal contact curvature ratio as a function of a geometry of the roller bearing and the lambda ratio.

FIG. 6 illustrates an example of the optimal contact curvature ratio $k_{rm}$ as a function of $H_{ucut}$ and $\lambda_0$, where $$H_{ucut} = \frac{h_{ucut}}{b \cos \beta}$$

$h_{ucut}$ represents the maximum allowable height of the undercut 45 measured in a plane perpendicular to the raceways 14, 44.

The optimal contact curvature ratio $k_{rm}$ increases as $H_{ucut}$ increases, and decreases as lubrication condition, characterized by $\lambda_0$, improves. Under ideal lubrication conditions with essentially no undercut 45, a minimum contact curvature ratio $k_{rm}$ of 3.401 was suggested. As a practical matter, for all things considered, a minimum contact curvature ratio $k_{rm}$ between about 3.0 and about 3.5 is recommended.

Various features of the invention are set forth in the following claims.

The invention claimed is:

1. A roller bearing defining a bearing axis and a radial plane oriented parallel with the bearing axis, the roller bearing comprising:
    an inner ring including an inner raceway and an inner flange extending from the inner raceway, the inner flange including an inner guide surface; and
    a plurality of rollers in rolling engagement with the inner raceway about the bearing axis, each roller including a first end surface in engagement with the inner guide surface of the inner flange as the plurality of rollers move relative to the inner ring;
    wherein the first end surfaces of each roller define a curvature such that a ratio of a first principal effective curvature radius of the inner ring in a plane perpendicular to the radial plane and a second principal effective curvature radius of the inner ring in the radial plane is no less than 3.0;
    wherein the first principal effective curvature radius of the inner ring at a contact area between the inner flange and the first end surfaces of the plurality of rollers is defined as:

$$R_{x\_in} = \frac{(D_{rol} - 2h_{cnt})(D_{inr} + 2h_{cnt})}{2(D_{rol} + D_{inr})\sin\beta}$$

and wherein $D_{rol}$ is the diameter of the plurality of rollers, $h_{cnt}$ is the height of contact between the plurality of rollers and the inner guide surface relative to the inner raceway, $D_{inr}$ is the diameter of the inner raceway, and β is the contact angle between a tangent line through a contact point between the first end surfaces of the plurality of rollers and the inner guide surface and a line perpendicular to the bearing axis; and wherein the second principal effective curvature radius of the inner ring is defined as:

$$R_{y\_in} = \frac{R_{rib2} \cdot R_{rol2}}{R_{rib2} + R_{rol2}}$$

and wherein $R_{rib2}$ is a curvature radius of the inner guide surface within the radial plane, and $R_{rol2}$ is a curvature radius of the first end surfaces of the plurality of rollers near the contact point within the radial plane.

2. The roller bearing of claim 1, further comprising an outer ring including an outer raceway and an outer flange having an outer guide surface, wherein second end surfaces of the plurality of rollers are in engagement with the outer guide surface of the outer flange as the plurality of rollers move relative to the outer ring.

3. The roller bearing of claim 2, wherein a first principal effective curvature radius of the outer ring at a contact area between the outer flange and the second end surfaces of plurality of rollers is defined as:

$$R_{x\_out} = \frac{(D_{out} - 2h_{cnt})(D_{rol} - 2h_{cnt})}{2(D_{out} - D_{rol})\sin\beta}$$

and wherein $D_{out}$ is the diameter of the outer raceway.

* * * * *